(No Model.) 2 Sheets—Sheet 1.

O. HAMMERSTEIN.
CIGAR BUNCHING MACHINE.

No. 430,644. Patented June 24, 1890.

WITNESSES:
Gustave Dieterich
J. F. Bourne

INVENTOR
Oscar Hammerstein
by
Briesen, Steele & Knauth
ATTORNEYS

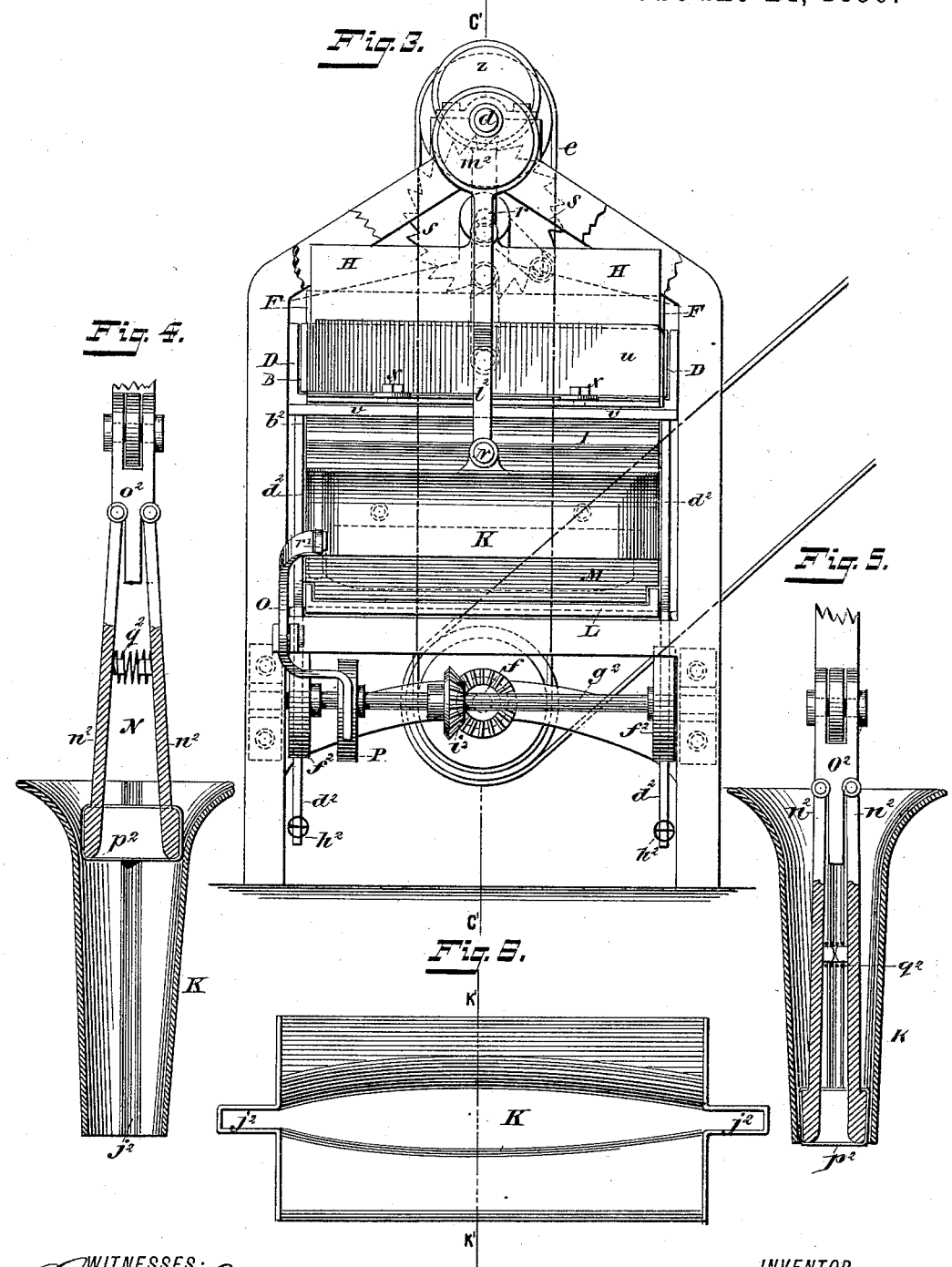

UNITED STATES PATENT OFFICE.

OSCAR HAMMERSTEIN, OF NEW YORK, N. Y.

CIGAR-BUNCHING MACHINE.

SPECIFICATION forming part of Letters Patent No. 430,644, dated June 24, 1890.

Application filed July 25, 1889. Serial No. 318,655. (No model.)

*To all whom it may concern:*

Be it known that I, OSCAR HAMMERSTEIN, a resident of the city of New York, county and State of New York, have invented an Improvement in Cigar-Bunching Machines, of which the following is a specification.

The object of my invention is to provide an improved cigar-bunching machine.

The invention consists in the novel details of improvement and the combinations of parts that will be more fully hereinafter set forth, and then pointed out in the claims.

Reference is to be had to the accompanying drawings, forming part of this specification, wherein—

Figure 1:
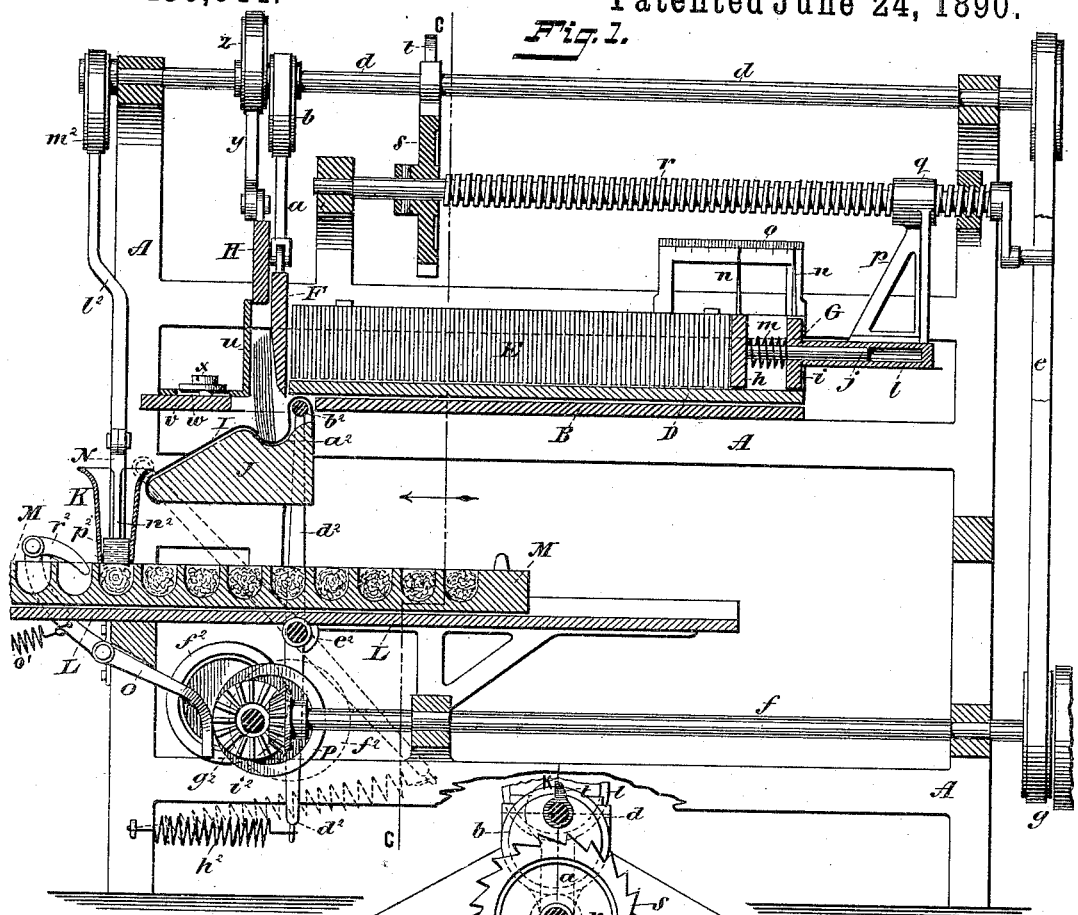
Figure 2:
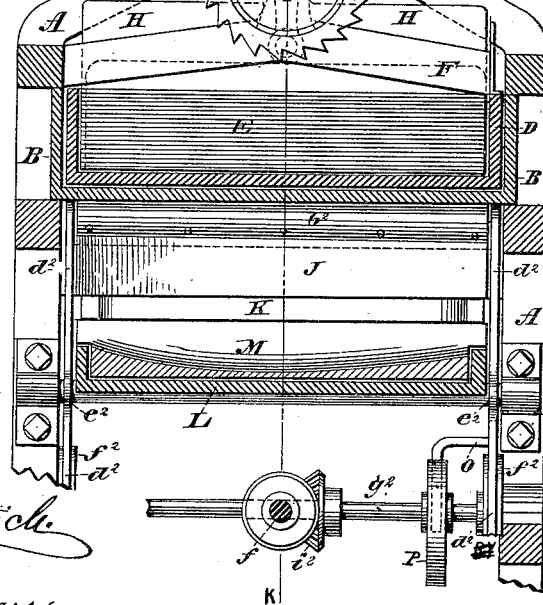

Figure 1 is a vertical longitudinal section on the plane of the line $c'\,c'$, Fig. 3, of my improved cigar-bunching apparatus. Fig. 2 is a vertical transverse section on the line $c\,c$, Fig. 1. Fig. 3 is an end elevation of the machine shown in Fig. 1. Fig. 4 is an enlarged vertical cross-section of the funnel and plunger for passing the bunch from the rolling-apron to the mold. Fig. 5 is a similar view showing the plunger depressed, and Fig. 6 is a top view of said funnel.

In the accompanying drawings, the letter A represents the frame of my bunching-machine, which frame may be of any suitable construction. The frame A carries an open-ended trough or other support B, that is adapted to receive and support a tobacco-leaf receptacle D. (See Figs. 1 and 2.) The receptacle D is shown open on its upper side when in the trough B, and it is adapted to receive a quantity of tobacco-leaves E, as shown. The leaves E may be arranged in any desired manner in the receptacle D, so that bunches of leaves of the desired thickness may be cut off, as hereinafter explained. One mode of filling such a receptacle D with leaves is shown in an application for a patent filed by me in the United States Patent Office on September 12, 1888, Serial No. 285,184.

When the receptacle D is placed in the trough B, one of its ends is moved up against a knife F, that is guided at its ends in suitable guides in the frame A, and that is adapted to cut leaves when passed from the receptacle D. The knife F is connected by a rod $a$ to an eccentric $b$ on a shaft $d$, that is journaled in suitable bearings in the frame A; but said knife may be operated in any other suitable manner. The shaft $d$ may be driven by any suitable means; but, as shown in the drawings, it is driven by a belt $e$, that passes over a pulley on said shaft, and also over a pulley on a shaft $f$, that is suitably journaled in bearings in the frame A, which shaft $f$ may be driven by a belt passing over a pulley $g$ on said shaft or in any other suitable manner. When the tobacco-leaves are in the receptacle D, they may be compacted more or less therein or unevenly, so that when passed to the action of the knife F more or less leaves would be pushed under said knife, according to the compactness thereof, so that the fillers might not be regular. To overcome this difficulty, I provide the following means: When the receptacle D is in position in the trough B, the upper side and ends are or may be thrown back or removed, so that the tobacco-leaves E will be free to be moved in the receptacle D. To push the tobacco-leaves from the receptacle D and to the action of the knife F, I may use suitable means. In Fig. 1 of the accompanying drawings is shown a piston G for this purpose. In order that the leaves E before being passed to the action of the knife F may have a certain predetermined compactness, I make the piston G in two parts—that is to say, with a double head $h\,i$. The head $h$ of the piston G carries a rod $j$, that passes through the head $i$ and into a tube $l$, carried by the head $i$. Between the heads $h\,i$ is interposed a spring $m$. The heads $h\,i$ each carry a pointer $n$, that passes across an index $o$, as in Fig. 1, whereby a sight-gage is formed. To the tube $l$ is secured a bracket or extension $p$, that supports a sleeve $q$. The sleeve $q$ is adapted to pass over a worm-shaft $r$, that is suitably journaled in bearings in the frame A. By this means as the worm $r$ is rotated the piston G will be advanced through the receptacle D to push the tobacco-leaves therefrom. The worm-shaft $r$ should receive intermittent rotary motion, and for this purpose I place upon said shaft a toothed or ratchet wheel $s$, that is adapted to be engaged by a pawl $t$, that is carried by the shaft $d$, so that at each revolution of the shaft $d$ the ratchet $s$ will be turned a certain number of teeth, thereby moving the sleeve $q$ and the piston G forward a short distance. The spring $m$ in the piston G is of such a resistance that the head $h$ of the piston may be pressed against the tobacco until said tobacco is compressed to the desired extent without being moved toward the head $i$. For instance, supposing it is desired that the tobacco-leaves E shall have a compression of, say, five pounds. The spring $m$ will then be set to a resistance of five pounds. When the piston G is first placed against the tobacco-leaves E, the worm $r$ will be turned to advance the piston G, which in its forward movement will compress the tobacco-leaves E. The knife F in the meantime is lowered against the tobacco-leaves at the opposite end of the receptacle D to prevent the leaves being pushed therefrom. When the required compression of the tobacco has been reached—say the five pounds—and a further forward movement is given to the piston, the resistance of the spring $m$ will be overcome. The head $h$ will now come to rest, while the head $i$ will advance slightly independently of the head $h$. The pointers $n$ thereby, being moved toward each other, will indicate to the operator that the required compression has been reached. The apparatus will then be started, the knife F being now moved upward. When the knife is above the tobacco-leaves, the pawl $t$ will act upon the ratchet $s$ to turn the worm $r$ and thereby advance the piston G a certain distance. This advancing of the piston will move the tobacco-leaves contained in the receptacle D and pass those at the knife end of the receptacle from said receptacle, which leaves will abut against a stop or plate $u$, that is supported on a cross-piece $v$, carried by the frame A. The plate $u$ is adjustable toward and from the receptacle D, and for this purpose it is provided with slots $w$, through which pass bolts or screws $x$, which enter the cross-piece $v$. By this means the desired quantity of tobacco-leaves to be passed from the receptacle D at a time for a filler may be determined.

If preferred, a suitable compressed-air cushion and pressure-gage could be used instead of the spring $m$ between the heads $h$ $i$ of the piston G.

When the tobacco-leaves have been passed from the receptacle D and against the guide-plate $u$, the piston G will cease moving and the knife F will descend to cut off the leaves projecting from the receptacle D. As the knife F next ascends, a plunger H, that is placed close to the knife F and that is guided in suitable guides in the frame A, will descend and push the bunch of tobacco cut by the knife down from beneath the end of the receptacle D and the guide-plate $u$ upon a rolling-apron I, a binder being previously placed upon the apron. The plunger H is connected by a rod $y$ with an eccentric $z$ on the shaft $d$, whereby said plunger is reciprocated; but said plunger may be otherwise moved, if desired.

The rolling-apron I may be of any desired construction. In Fig. 1 of the accompanying drawings the apron I is shown as secured to a table or block J, that is carried by the frame A, a cavity $a^2$ being provided in said block to receive the bunch. $b^2$ is a roller that extends across the table or block J and it is placed beneath the apron I. The roller $b^2$ is journaled at its ends in levers $d^2$, that are pivoted, as at $e^2$, in the frame A. The lower ends of these levers come against cams $f^2$, that are carried by a shaft $g^2$, that extends across the frame A and is suitably journaled in bearings in said frame. The levers $d^2$ are held against said cams by springs $h^2$, that are secured to said levers and also to the frame A. The shaft $g^2$ is driven by the shaft $f$, and is connected thereto for this purpose by miter-gearing or the like $i^2$. As the cams $f^2$ are rotated, the levers $d^2$ will be rocked on their pivots, thereby moving the roller $b^2$ over the upper side of the block J to draw the apron I, and thereby roll a bunch in the ordinary manner.

The bunch from the rolling-apron I passes into a funnel K, that is suitably carried by the frame A. The shape of this funnel is clearly shown in Figs. 4 and 6, wherein its greatest width conforms substantially to the shape of a cigar. (See Fig. 6.) The funnel K at its sides is provided with extensions or pockets $j^2$, (see Fig. 6,) into which the ends of the binders that project from the filler may pass. As shown in cross-section in Fig. 4, the funnel K tapers from its upper edge downward, being narrower at the lower end than at the upper. The lower end of the funnel K comes above a table or support L, that is carried by the frame A. Upon this table L cigar-molds M are to be placed and are guided on said table, so as to have longitudinal movement thereon. The filler or bunch from the funnel K is adapted to pass into the cavities in the mold M. In order to expel the filler or bunch from the funnel K and pass it to the mold M, I provide a plunger N, that passes into the funnel K. The plunger N is connected by a rod $l^2$ with an eccentric $m^2$, that is carried by the shaft $d$, whereby said plunger is reciprocated; but said plunger may be otherwise reciprocated, if desired. In order that the plunger N may fit closely against the inner wall of the tapering funnel K at all times, I make said plunger to consist of two pivoted blades $n^2$, that are carried by a block $o^2$, that is pivoted to the rod $l^2$. The lower edges of the blades $n^2$ of the plunger N are connected by a fabric or other flexible material $p^2$, which forms the bottom of the plunger N. The blades $n^2$ are pressed outward by a spring $q^2$. By this means the plunger N may always be in contact with the tobacco filler or bunch, while at the same time closely fitting the interior of the tapering funnel K.

The mold M may be moved along the table or support L in any suitable manner. In the drawings I have shown a mechanism for moving it. This mechanism consists of a lever O, that is pivoted to the frame A, which lever carries at one end a dog $r^2$, (see Fig. 1,) that is adapted to enter the cavities of the mold. The opposite end of the lever O comes against a cam P, that is carried by the shaft $g^2$. The lever O is held against said cam by a spring $o'$ or otherwise. As said cam rotates, the lever O will be rocked in its bearings, the dog $r^2$ entering each cavity in the mold in succession and pushing the mold the space of one cavity at each revolution of the cam P.

With the above apparatus the parts should be so adjusted that while the knife F is cutting off one bunch the plunger N will push a previously-cut bunch from the funnel K into a cavity of the mold M, and while these parts F N are returning to the upper position the roller $b^2$ and apron I will be rolling the bunch last cut by the knife F. Each time the knife rises the piston G will move forward to press more tobacco from the receptacle D to the action of the knife F; but the movements of the parts may be otherwise arranged from that stated.

Having now described my invention, what I claim is—

1. The combination, with a receptacle for containing tobacco-leaves, of a compressible piston for compressing the leaves in the receptacle and for pushing the leaves from the receptacle, and of a sight gage or indicator connected with and actuated by the piston for indicating each time the piston is moved when the desired compression of the leaves has been reached.

2. The combination, with a receptacle for containing tobacco-leaves, of a compressible piston for compressing the leaves in the receptacle and for pushing the leaves from the receptacle, a sight gage or indicator connected with and actuated by said compressible piston for indicating to the operator when the desired compression of the leaves has been reached, and a cutter for cutting the tobacco-leaves into bunches as they are pushed from the receptacle, substantially as described.

3. The combination, with a receptacle D, for containing tobacco-leaves, of a piston having double heads and a cushion between said heads, a gage connected with said piston, and a cutter for cutting the tobacco-leaves into bunches as they are pushed from the receptacle, substantially as described.

4. The receptacle D for tobacco-leaves and a cutter at one end of said receptacle for cutting tobacco into bunches, combined with a piston having heads $h\ i$ and a spring or cushion between said heads, and with a gage for indicating when the heads move toward each other, and with means, substantially as described, for actuating the cutter and the piston, substantially as specified.

5. The combination of the receptacle D, for containing tobacco-leaves, and a compression piston and gage with a cutter F and an adjustable stop $u$ to regulate the quantity of tobacco to be pressed from the receptacle D, substantially as described.

6. The receptacle D, for containing tobacco-leaves, and a compression piston and gage, combined with a cutter F and stop $u$, a plunger between the cutter and the stop $u$, and a rolling-apron for rolling a cigar-bunch, substantially as described.

7. The rolling-apron I and roller $b^2$, combined with the funnel K, placed contiguous to said apron, said funnel having side pockets $j^2$, substantially as described.

8. A tapering funnel K, combined with a plunger having movable sides that contact the walls of the funnel during the passage of the plunger through the funnel, substantially as described.

9. A tapering funnel K, combined with a plunger having pivoted blades $n^2$ and a flexible lower end $p^2$, substantially as described.

10. The combination, with a funnel K, having tapering inner walls and end pockets $j^2$, of a plunger having pivoted blades $n^2$ and a flexible lower end $p^2$ and a spring between the blades $n^2$, substantially as described.

11. The funnel K, tapered from its upper to its lower end, and a plunger N for said funnel, said plunger having a flexible lower end, combined with a cigar-mold beneath said funnel, substantially as described.

OSCAR HAMMERSTEIN.

Witnesses:
HARRY M. TURK,
T. F. BOURNE.